H. L. PALMER.

Nonconducting Tablets, Platforms, or Mats.

No. 5,562. Reissued September 2, 1873.

WITNESSES;

Geo. H. Moore

Thos. Houghton.

INVENTOR;

Henry L. Palmer.
by his
attorney
James A. Stillson.

UNITED STATES PATENT OFFICE.

HENRY L. PALMER, OF NEW YORK, N. Y., ASSIGNOR OF ONE-HALF INTEREST TO CHARLES C. SKILTON, OF SAME PLACE.

IMPROVEMENT IN NON-CONDUCTING TABLETS, PLATFORMS, OR MATS.

Specification forming part of Letters Patent No. 141,812, dated August 12, 1873; reissue No. 5,562, dated September 2, 1873; application filed August 29, 1873.

*To all whom it may concern:*

Be it known that I, HENRY L. PALMER, of the city, county, and State of New York, have invented a Non-Conducting Tablet, Platform, or Mat, of which the following is a specification:

My invention relates to a non-conducting tablet, platform, or mat, for the purpose of protecting furniture, the tops of tables, carpets, oil-cloths, &c., from the action of heat. It consists, first, of a new article of manufacture, composed of a body of wood, made by the combination of two or more thin sheets of wood or veneers, preferably cemented or adhering together, and laid with the grain of the wood of the alternate veneers crossing at or near right angles to each other, and of a sheet of metal overlying and in some manner secured to the same; second, of the body of wood composed of thin sheets or veneers, and an overlying sheet of metal, having its edge or edges turned over the edge of the wood and lapped under the same, thereby securing all together in one way; third, of the same or similar body of wood, having the sheet of metal simply cut out of the same form and about the size of the pile of veneers, and laid thereon, the whole being then placed in and secured to a rabbeted molding of wood or other suitable material, as another way; fourth, of an air-space under the metal sheet, provided by simply cutting away the board where required.

Figure 1:
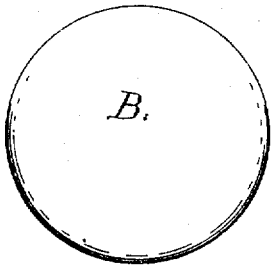
Figure 2:
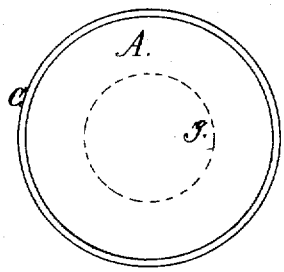
Figure 3:
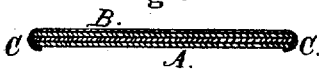
Figure 4:
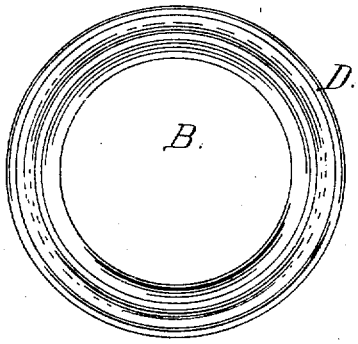
Figure 5:
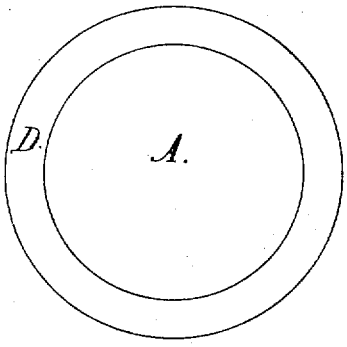
Figure 6:
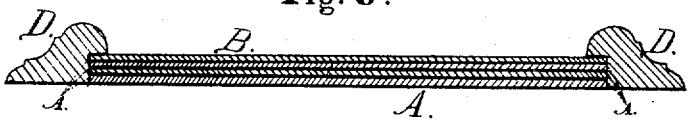

The platform, tablet, or mat is illustrated more in detail in Figures 1, 2, 3, 4, 5, and 6, Fig. 1 being a plan of the first form upon the upper side; Fig. 2, a plan of the under side; Fig. 3, the section of the same, all with the metal turned under; Fig. 4, a plan of the second form upon the upper side; Fig. 5, a plan of the under side of the second form; and Fig. 6, the section of the second form.

The letter A indicates the wood portion of the platform or tablet; B, the metallic. C represents the lopped or turned portion of the sheet of metal in the first and most simple form; D, the bead or molding surrounding the second form; and *g*, Fig. 2, the wood body, cut away in the center to give an air-space under the metal. This feature is not an invariable part of my invention, as in all ordinary cases it is made without the air-space. However, the wood may be cut away in the center, if the particular use to which the tablet is applied requires an air-space under the sheet of metal.

It is evident that the form of the molding may be varied, even so as to slope outward from the surface of the sheet of metal, in order to allow the tablet to be kept clean with facility.

The body of wood and the sheet of metal may be secured together in other ways; but the basis of my invention is the two, however secured to each other, when made into a tablet, platform, or mat of a non-conducting character, to protect against the action of heat.

In platforms, tablets, or mats hitherto made, pasteboard has been used as the body, with a view to produce a thin non-warping article; but moisture easily acts upon it, and injures, if it does not destroy, its usefulness.

A frame consisting of felly-shaped pieces on which thin boards are secured as a body has been used; but these fellies have to be secured in place during manufacture by nails or screws, and the effect of heat soon shows itself by loosening and warping the wooden frame and cover.

My invention, however, can be made as thin as if made of pasteboard, and more strong and reliable than when made of separate pieces of heavy wood.

I claim—

1. As a new article of manufacture, a tablet, platform, or mat composed of a body made of thin sheets of wood or veneers, and of a sheet of metal secured thereto.

2. In a tablet, platform, or mat, a body composed of veneers or thin sheets of wood and a sheet of metal placed thereon, with its edge turned under the same to secure the body and sheet of metal together.

3. In a tablet, platform, or mat, a body composed of veneers or thin sheets of wood, glued or otherwise secured to each other, and a sheet of metal placed thereon, surrounded by and attached to a bead, border, or molding of wood, substantially in the manner shown.

4. In a tablet, platform, or mat, a body of wood covered by a sheet of metal, and cut out in the center under the sheet of metal, whereby an air-space is created between the metal and the resting-place of the tablet, platform, or mat.

HENRY L. PALMER.

Witnesses:
JAMES A. SKILTON,
L. M. ROWE.